United States Patent
Bleile et al.

(10) Patent No.: US 6,968,689 B2
(45) Date of Patent: Nov. 29, 2005

(54) METHOD AND DEVICE FOR REGULATING THE BOOST PRESSURE OF AN INTERNAL COMBUSTION ENGINE

(75) Inventors: Thomas Bleile, Stuttgart (DE); Michael Scheidt, Stuttgart (DE); Eduard Moser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/838,543

(22) Filed: May 3, 2004

(65) Prior Publication Data

US 2005/0000216 A1    Jan. 6, 2005

(30) Foreign Application Priority Data

May 6, 2003    (DE)    ................................ 103 20 056

(51) Int. Cl.[7] .................. F02B 37/12; F02B 33/44; F02D 41/00
(52) U.S. Cl. ......................................... 60/612; 60/602
(58) Field of Search ... 60/612, 600–603; F02B 37/12; F02D 41/00

(56) References Cited

U.S. PATENT DOCUMENTS

| 5,140,817 A | 8/1992 | Matsuda et al. | ............... 60/612 |
| 5,289,684 A | 3/1994 | Yoshioka et al. | ............. 60/612 |
| 6,202,414 B1 * | 3/2001 | Schmidt et al. | ............... 60/612 |
| 6,202,415 B1 * | 3/2001 | Lohmann et al. | ............. 60/612 |
| 6,263,673 B1 * | 7/2001 | Schmidt et al. | ............... 60/612 |

FOREIGN PATENT DOCUMENTS

| DE | 198 10 174 | 4/1999 | .......... F02D 41/22 |
| DE | 100 10 978 | 9/2001 | .......... F02B 37/12 |
| EP | 1 302 646 | 4/2003 | .................. 60/612 |
| WO | WO 2003081005 A1 * | 10/2003 | .......... F02D 41/00 |
| WO | WO 2004104393 A1 * | 12/2004 | .......... F02D 41/00 |

\* cited by examiner

Primary Examiner—Thai-Ba Trieu
(74) Attorney, Agent, or Firm—Kenyon & Kenyon

(57) ABSTRACT

A method and a device for regulating the boost pressure of an internal combustion engine having a multiflow air system, which enables both rapid regulation and limitation of the exhaust gas back pressures. The multiflow air system includes a multichannel air supply and a corresponding multichannel exhaust gas discharge, each exhaust gas channel having an exhaust gas turbocharger. A manipulated variable for a specified boost pressure to be set is determined as a function of the actual exhaust gas back pressure prevailing in the particular exhaust gas channel.

6 Claims, 4 Drawing Sheets

METHOD AND DEVICE FOR REGULATING THE BOOST PRESSURE OF AN INTERNAL COMBUSTION ENGINE

BACKGROUND INFORMATION

It is known that large diesel engines in particular are increasingly equipped with double-flow air systems. Two turbochargers compress both fresh air mass flows to a common boost pressure. The exhaust gas mass flows drive the turbines of both turbochargers.

German Patent Application No. DE 100 10 978 describes a method for regulating the boost pressure of an internal combustion engine having an exhaust gas turbocharger. A specified exhaust gas back pressure is established by a first controller from the difference between a specified boost pressure and an actual boost pressure, and the manipulated variable for the turbine geometry of the exhaust gas turbocharger is derived by a second controller from the difference between the specified exhaust gas back pressure and a measured or estimated actual exhaust gas back pressure. In this manner, a cascade controller is implemented. The cascade controller permits the exhaust gas back pressure to be limited and, at the same time, the regulating response to be improved.

SUMMARY OF THE INVENTION

The method according to the present invention and the device according to the present invention for regulating the boost pressure of an internal combustion engine have the advantage that a manipulated variable for implementing a specified boost pressure to be set is determined as a function of the actual exhaust gas back pressure prevailing in the particular exhaust gas channel, a total specified exhaust gas back pressure being determined by a first controller from the difference between the specified boost pressure and an actual boost pressure, and a specified exhaust gas back pressure being determined for the individual exhaust gas channels from the total specified exhaust gas back pressure as a function of a difference between the air mass flows supplied over the air channels of the engine, and the particular manipulated variable for the specified boost pressure to be set is determined by an additional controller from a difference between the specified exhaust gas back pressure and the actual exhaust gas back pressure of the particular exhaust gas channel. In this way, it is possible to equalize the fresh air mass flows supplied to the engine via the individual air channels. At the same time, the exhaust gas back pressure is limited, and the regulating response of the cascade controller is improved for the multiflow air system as a whole.

It is particularly advantageous if a relationship between the particular specified exhaust gas back pressures for the individual exhaust gas channels is set in such a way that the air mass flows supplied via the air channels are approximately equal. In this way, the same rotational speed may be implemented for both exhaust gas turbochargers.

Another advantage arises if the difference between the air mass flows supplied via the air channels is supplied to an additional controller and if this additional controller delivers a weighting factor as a function of the difference between the air mass flows, the weighting factor being used to weight the total specified exhaust gas back pressure to form the individual exhaust gas back pressures for the particular exhaust gas channels. In this way, it is possible to equalize the air mass flows supplied to the engine in a particularly reliable and stable manner by using this additional controller.

Another advantage arises if the difference between the air mass flows supplied via the air channels is low-pass filtered. In this way, it is possible to filter out sensor noises to determine the air mass flows. The measured values for the air mass flows supplied via the air channels of the engine thus become extremely low-noise and therefore less susceptible to errors.

It is furthermore advantageous if the difference between the air mass flows supplied via the air channels is normalized to an engine speed of the internal combustion engine. In this way, it is possible to equalize the air mass flows supplied to the internal combustion engine via the air channels independently of the engine speed, using a constant time constant.

DETAILED DESCRIPTION

Figure 1:
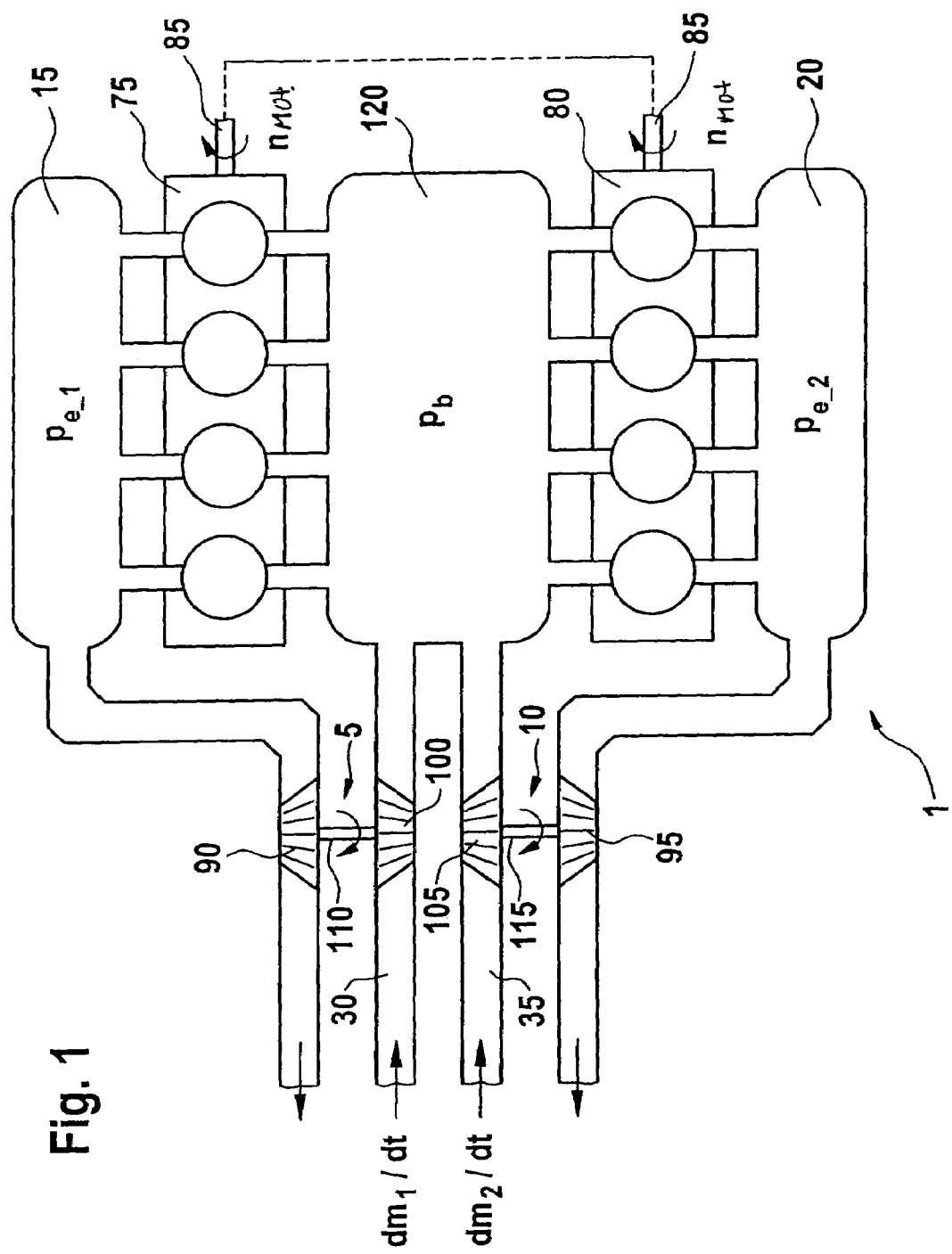
FIG. 1 shows a schematic view of an internal combustion engine having a multiflow air system.

In FIG. 1, internal combustion engine 1, of a motor vehicle for example, includes a first engine bank 75 and a second engine bank 80. First engine bank 75 and second engine bank 80 may each be designed as a diesel engine or a gasoline engine. The two engine banks 75, 80 are supplied with fresh air via a first air channel 30 and a second air channel 35. A first air mass flow or fresh air mass flow dm1/dt, supplied via first air channel 30, is compressed by a first compressor 100 of a first exhaust gas turbocharger 5. A second air mass flow or fresh air mass flow dm2/dt, supplied via second air channel 35, is compressed by a second compressor 105 of a second exhaust gas turbocharger 10. Both fresh air mass flows dm1/dt and dm2/dt are combined into a common air chamber 120, which is under boost pressure pb. Fresh air is supplied to both engine banks 75, 80 from common air chamber 120. Each of the two engine banks 75, 80 includes in the example of FIG. 1 four cylinders not depicted in detail. Fresh air from common air chamber 120 is distributed into the combustion chambers of the individual cylinders. Furthermore, fuel is supplied to the combustion chambers of the individual cylinders either directly or via common air chamber 120. The air/fuel mixture thus formed in the combustion chambers is ignited and drives a crankshaft 85 via the cylinder pistons in a manner known to those skilled in the art. The rotational speed of crankshaft 85 and thus engine speed nmot is determinable with the aid of a rotational speed sensor not shown in FIG. 1. The exhaust gas formed by the combustion of the air/fuel mixture in the combustion chambers of first engine block 75 is removed via a first exhaust gas channel 15. The exhaust gas formed by the combustion of the air/fuel mixture in the combustion chambers of second engine block 80 is removed via a second exhaust gas channel 20. A first exhaust gas back pressure pe_1 prevails in first exhaust gas channel 15. A second exhaust gas back pressure pe_2 prevails in second exhaust gas channel 20. A first turbine 90 of first exhaust gas turbocharger 5, which drives first compressor 100 via a first shaft 110, is situated in first exhaust gas channel 15. A second turbine 95 of second exhaust gas turbocharger 10, which drives second compressor 105 via a second shaft 115, is situated in second exhaust gas channel 20.

The air system of engine 1 having the two air channels 30, 35 and the two exhaust gas channels 15, 20 is a double-flow system. First fresh air mass flow dm1/dt and second fresh air mass flow dm2/dt are measurable by one air mass flow meter in each case (not shown in FIG. 1) in first air channel 30 and second air channel 35, respectively, or modeled in a manner known to those skilled in the art. Furthermore, a first actual exhaust gas back pressure pe_1_actual in first exhaust gas channel 15 and a second actual exhaust gas back pressure pe_2_actual in second exhaust gas channel 20 are measurable by respective pressure sensors (not shown in FIG. 1) in first exhaust gas channel 15 and second exhaust gas channel 20, respectively, or modeled in a manner known to those skilled in the art. Similarly, an actual boost pressure pb_actual in common air chamber 120 is measurable by a pressure sensor (not shown in FIG. 1) or modeled in a manner known to those skilled in the art.

Figure 2:
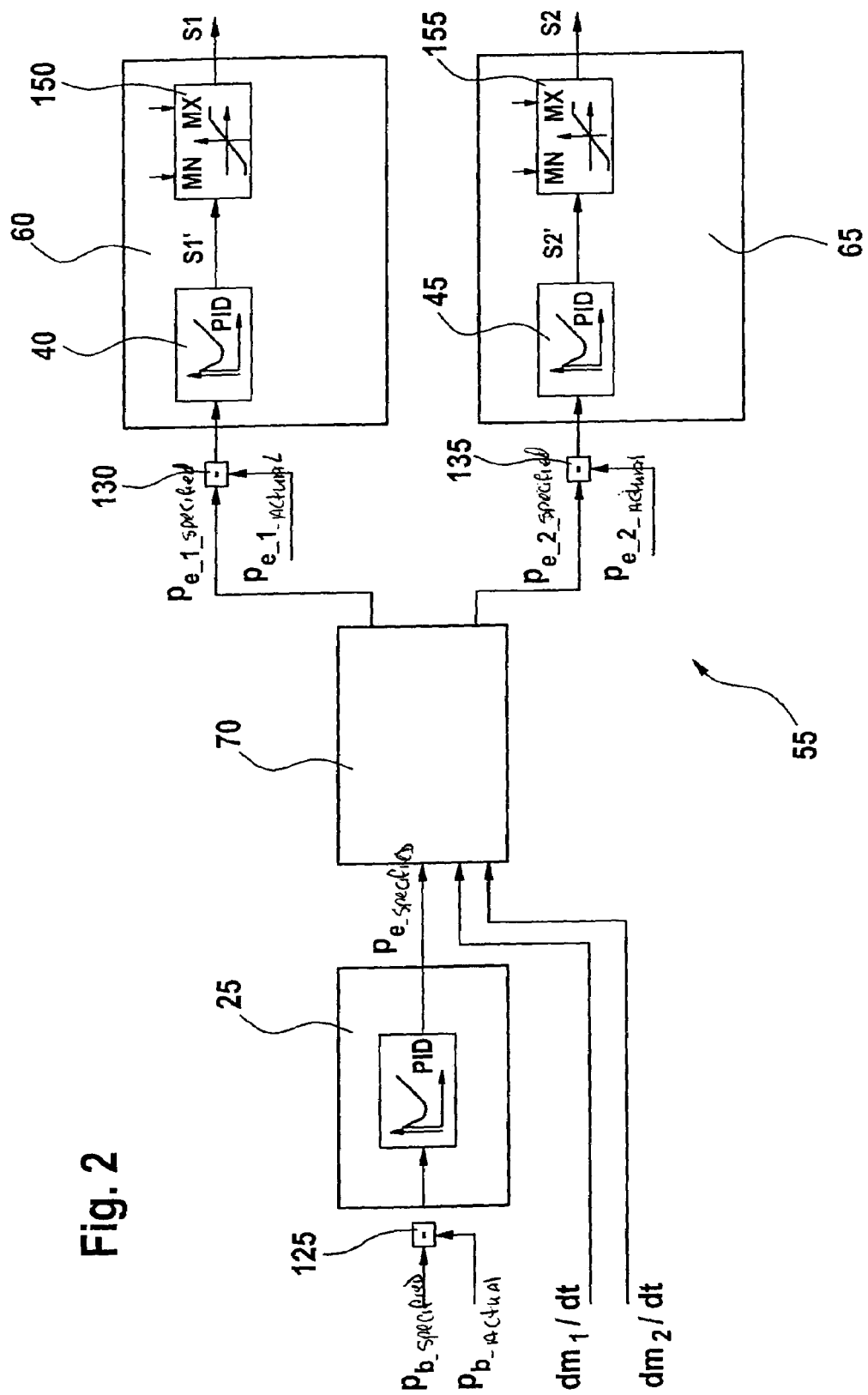
FIG. 2 shows a function diagram for illustrating the method according to the present invention.

According to the present invention, a device 55 is provided according to FIG. 2, which represents a boost pressure controller and is used for regulating boost pressure pb in common air chamber 120, also referred to as pressure accumulator, to a predefined specified boost pressure pb_spec. Boost pressure controller 55 sets the required charging of the supplied fresh air mass flows by using the two exhaust gas turbochargers 5, 10. For this purpose, a waste gate or a variable turbine geometry of the particular exhaust gas turbochargers 5, 10 is activated by an appropriate manipulated variable.

In the function diagram of FIG. 2, specified boost pressure pb_spec is supplied to a first subtractor 125. Actual boost pressure pb_actual is subtracted from specified boost pressure pb_spec in first subtractor 125. The difference formed is supplied to a first controller 25, which may be designed as a PID controller, for example. At the output of first controller 25, there is a total specified exhaust gas back pressure pe_spec as also described in German Patent Application No. DE 100 10 978. This total specified exhaust gas back pressure pe_spec is supplied to a third computing unit 70. In addition, measured or modeled values of first air mass flow dm1/dt and second air mass flow dm2/dt are supplied to third computing unit 70. Third computing unit 70 computes a first specified exhaust gas back pressure pe_1_spec for first exhaust gas channel 15 and a second specified exhaust gas back pressure pe_2_spec for second exhaust gas channel 20 from the total specified exhaust gas back pressure pe_spec as a function of a difference between first air mass flow dm1/dt and second air mass flow dm2/dt in such a way that the two air mass flows dm1/dt and dm2/dt supplied via the two air channels 30, 35 are approximately of the same magnitude. First actual exhaust gas back pressure pe_1_actual is subtracted from first specified exhaust gas back pressure pe_1_spec in a second subtractor 130. The difference formed is supplied to a first computing device 60. First computing device 60 includes a third controller 40, which may also be designed as a PID controller.

A first intermediate manipulated variable S1', which is supplied to a first limiter 150 and is limited downward to a minimum value MN and upward to a maximum value MX, is formed at the output of third controller 40 as a function of the difference between first specified exhaust gas back pressure pe_1_spec and first actual exhaust gas back pressure pe_1_actual. At the output of first limiter 150 there is then first manipulated variable S1, optionally limited, which activates, as described above, the degree of opening of a waste gate or a variable turbine geometry of first exhaust gas turbocharger 5 to minimize the difference between specified boost pressure pb_spec and actual boost pressure pb_actual. Second actual exhaust gas back pressure pe_2_actual is subtracted from second specified exhaust gas back pressure pe_2_spec in a third subtractor 135. The difference formed is supplied to a second computing unit 65. Second computing unit 65 includes a fourth controller 45, which may also be designed as a PID controller, for example.

A second intermediate manipulated variable S2', which is supplied to a second limiter 155 and is limited downward to a minimum value MN and upward to a maximum value MX, is formed at the output of fourth controller 45 as a function of the difference between second specific exhaust gas back pressure pe_2_spec and second actual exhaust gas back pressure pe_2_actual. At the output of second limiter 155 there is then second manipulated variable S2, optionally limited, which activates, as described above, the degree of opening of a waste gate or a variable turbine geometry of second exhaust gas turbocharger 10 to minimize the difference between specified boost pressure pb_spec and actual boost pressure pb_actual.

Figure 3:
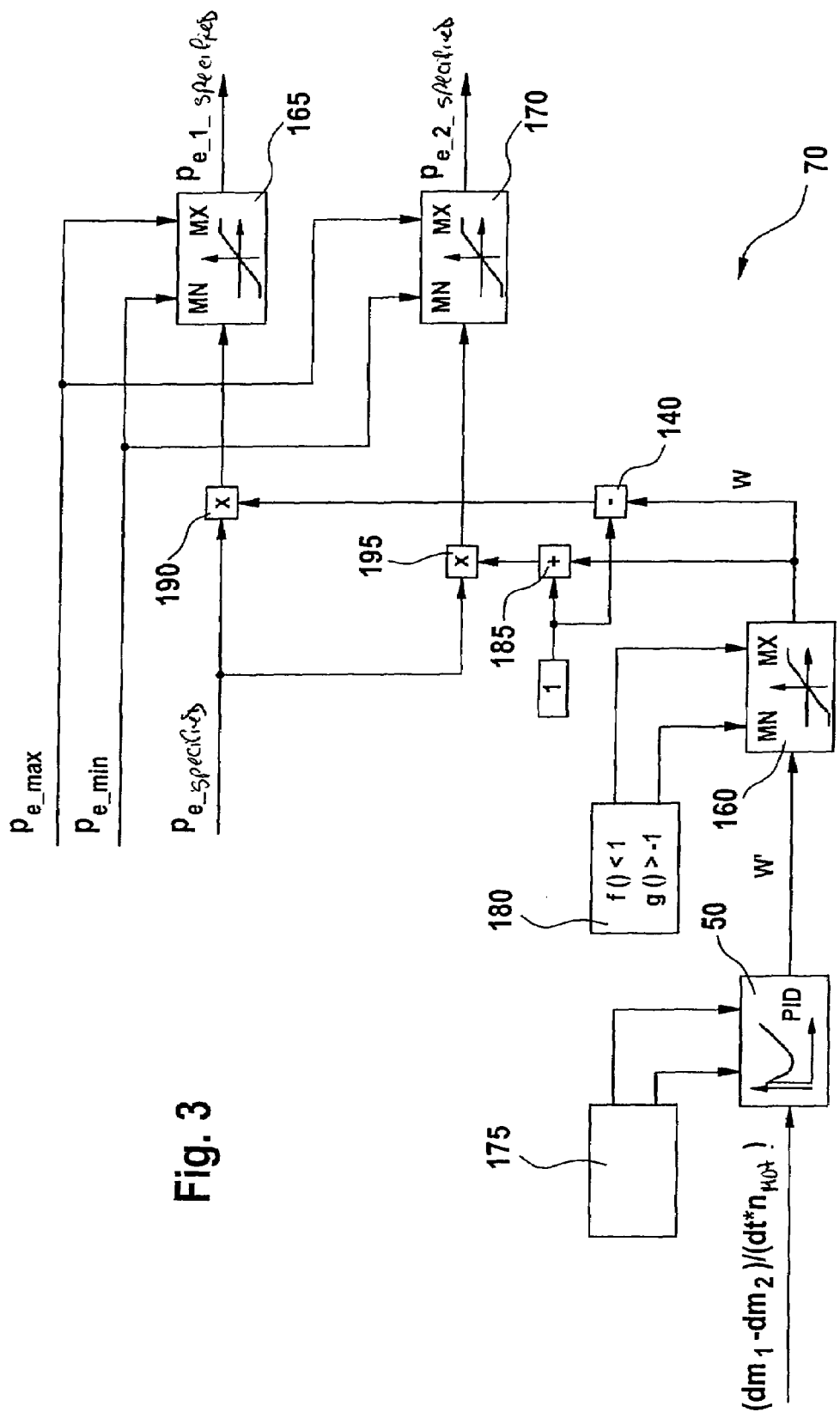
FIG. 3 shows a function diagram for forming the specified exhaust gas back pressures of the individual air channels to equalize the air mass flows supplied to the engine via the individual air channels.

FIG. 3 shows a function diagram of third computing unit 70, where the difference (dm1−dm2)/(dt*nmot) between the two air mass flows dm1/dt, dm2/dt, normalized to the engine speed and optionally low-pass filtered, is supplied to a second controller 50, which may also be designed as a PID controller, for example. The parameters of second controller 50 are adjusted to the instantaneous operating point of engine 1 via a parameter adjuster 175 in a manner known to those skilled in the art. Such an adjustment to the instantaneous operating point of engine 1 may also take place in first controller 25, third controller 40, and fourth controller 45 in a similar manner. However, adjustment to the instantaneous operating point of engine 1 is not absolutely necessary. An intermediate weighting factor W' is formed at the output of second controller 50 as a function of the supplied difference (dm1−dm2)/(dt*nmot), which is used for weighting the total specified exhaust gas back pressure pe_spec to form the two specified exhaust gas back pressures pe_1_spec and pe_2_spec for the two exhaust gas channels 15, 20. Intermediate weighting factor W' is initially supplied to a third limiter 160, where it is limited downward to a first operating point-dependent value g>−1 and upward to a second operating point-dependent value f<1. This operating point-dependent limitation is performed by a limitation generator 180. At the output of third limiter 160 there is then weighting factor W, optionally limited. Weighting factor W is subtracted from the value 1 in a fourth subtractor 140. The difference is multiplied by total specified exhaust gas back pressure pe_spec in a first multiplier 190. The multiplicative correction suggested in the example may also take place functionally pe_1_spec= $f_1$(pe_spec,W), pe_2_spec=$f_2$(pe_spec, W) as a characteristics map or additively.

The product formed is supplied to a fourth limiter 165, where it is limited downward to a predefined minimum specified exhaust gas back pressure pe_min and upward to a predefined maximum exhaust gas back pressure pe_max. At the output of fourth limiter 165 there is then first specified exhaust gas back pressure pe_1_spec, optionally limited. Weighting factor W is added to the value 1 in an adder 185. The sum is multiplied by total specified exhaust gas back pressure pe_spec in a second multiplier 195. The multiplicative correction suggested in the example may also takes place functionally pe_1_spec=$f_1$(pe_spec,W), pe_2_spec=$f_2$(pe_spec, W) as a characteristics map or additively.

Figure 4:
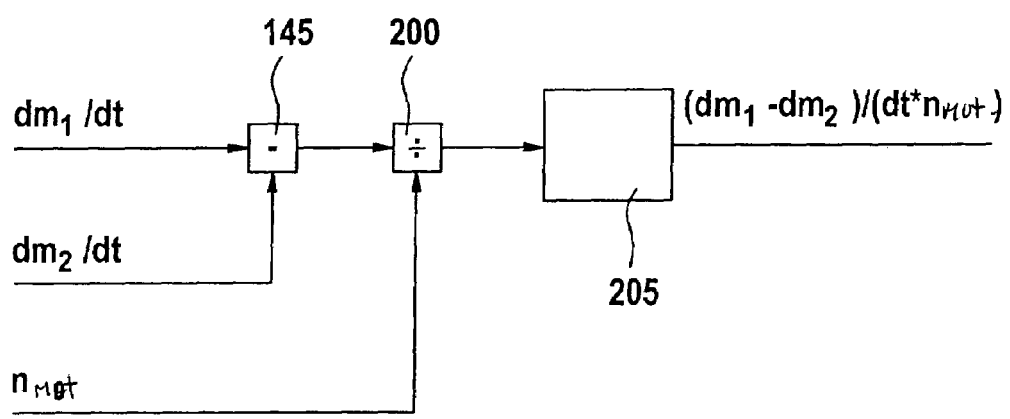
FIG. 4 shows a function diagram for forming a low-pass filtered difference between the air mass flows supplied to the engine via the individual air channels, which has been normalized to the engine speed.

The product formed is supplied to a fifth limiter 170, where it is limited downward to the minimum specified exhaust gas back pressure pe_min and upward to the maximum specified exhaust gas back pressure pe_max. At the output of fifth limiter 170 there is then second specified exhaust gas back pressure pe_2_spec, optionally limited. The difference (dm1−dm2)/(dt*nmot) between the two fresh air mass flows dm1/dt, dm2/dt is thus corrected to zero by second controller 50 in that the ratio between the two specified exhaust gas back pressures pe_1_spec, pe_2_spec is set appropriately using weighting factor W. Operating point-dependent parameter adjuster 175 and operating point-dependent setting of the limitation by limitation generator 180 may be implemented as a function of engine speed nmot and the injected fuel mass, which characterize the instantaneous operating point of engine 1. FIG. 4 shows a function diagram for determining difference (dm1−dm2)/(dt*nmot) between the two air mass flows dm1/dt, dm2/dt, supplied to controller 50. Second air mass flow dm2/dt is subtracted from first air mass flow dm1/dt in a fifth subtractor 145. The difference is supplied to a divider 200, where it is divided by engine speed nmot. This normalization to engine speed nmot is performed because the two air mass flows dm1/dt, dm2/dt are approximately proportional to engine speed nmot. This normalization is necessary if the equalization of the air mass flows is to work independently of engine speed nmot using a constant time constant. The quotient formed is supplied to a low-pass filter 205, where it is low-pass filtered. The noise on the sensors which are optionally used for measuring air mass flows dm1/dt, dm2/dt should thus be compensated. At the output there is then low-pass filtered difference (dm1−dm2)/(dt*nmot) of the two air mass flows dm1/dt, dm2/dt.

The cascade regulation known from German Patent Application No. DE 100 10 978 is applied to a double-flow air system using the function diagram of FIG. 2. Such a cascade controller is a special embodiment of the boost pressure regulation, and it was introduced to limit the exhaust gas back pressure and, simultaneously, to improve the regulation response. In particular when pneumatic actuators are used for setting the waste gate or the variable turbine geometry, considerably better regulation response is obtained, because interference on the respective actuators is more rapidly compensated for. The same holds true when particle filters are used in the two exhaust gas channels 15, 20, where interference due to particle filter loads may be more rapidly compensated for. The difference between actual boost pressure pe_actual and specified boost pressure pe_spec is compensated for by the first primary controller 25, known as the boost pressure controller, adjusting total specified exhaust gas back pressure pe_spec. The error signal between actual exhaust gas back pressure pe_1_actual, pe_2_actual and specified exhaust gas back pressure pe_1_spec, pe_2_spec of the particular exhaust gas channel 15, 20 is compensated for by setting the particular exhaust gas turbocharger 5, 10 using first manipulated variable S1 and second manipulated variable S2, respectively, with the aid of third secondary controller 40 and fourth secondary controller 45, respectively, known as exhaust gas back pressure controllers.

In the double-flow air system of FIG. 1, the two air mass flows dm1/dt, dm2/dt, which may be different even when the two exhaust gas turbochargers 5, 10 are activated in the same manner, are introduced into the two air channels 30, 35. Reasons for the difference in the air mass flows dm1/dt, dm2/dt include the following:

1. Turbines 90, 95 and compressors 100, 105 of the two exhaust gas turbochargers 5, 10 have different efficiencies.
2. The exhaust gas back pressures in the two exhaust gas channels 15, 20 are different, for example, due to different particle filter loads.
3. The two air channels 30, 35 and the two exhaust gas channels 15, 20 are usually arranged differently.

The object of optimum charging in a double-flow air system may only be achieved if the rotational speeds of the two exhaust gas turbochargers 5, 10 are set to be equal. Identical speeds of the two exhaust gas turbochargers 5, 10 result in maximum fresh air throughput, because the two exhaust gas turbochargers 5, 10 may be operated up to their maximum speeds, which is given by the stopper limit and the mechanical protection. Identical speeds of the two exhaust gas turbochargers 5, 10 result in maximum efficiency and thus minimum fuel consumption and a high air mass throughput. Equalizing the speeds of the two exhaust gas turbochargers 5, 10 also permits the speeds of both exhaust gas turbochargers 5, 10 to be limited more easily to avoid charger pumping. The rotational speeds of the two exhaust gas turbochargers 5, 10 are not directly available; therefore, the measured or modeled fresh air mass flows dm1/dt, dm2/dt are equalized instead to thus achieve equalization of the speeds of the two exhaust gas turbochargers 5, 10.

Using the method according to the present invention and the device according to the present invention, fresh air mass equalization is achieved for a multiflow, in particular a double-flow air system, which permits optimum charging of engine 1 while preserving all advantages of cascade regulation. Air mass equalization is integrated in the cascade controller as shown in FIG. 2. The two fresh air mass flows dm1/dt, dm2/dt are equalized in the manner described by varying the total specified exhaust gas back pressure pe_spec determined by primary boost pressure controller 25. Specified exhaust gas back pressures pe_1_spec, pe_2_spec for the two exhaust gas channels 15, 20, limited downward and upward are obtained as described, by the air mass equalization in third computing unit 70. In this way, air mass equalization, in the form of equalization of the two fresh air mass flows dm1/dt, dm2/dt, is then achieved with the aid of the two secondary controllers 40, 45 and the formation of the two manipulated variables S1, S2 as described. The two fresh air mass flows dm1/dt, dm2/dt are equalized by setting the ratio between the two specified exhaust gas back pressures pe_1_spec, pe_2_spec using weighting factor W. By integrating air mass equalization in the proven cascade controller, the limitation of the exhaust gas back pressures in both exhaust channels 15, 20 remains fully effective. At the same time, improved regulation response of the simple cascade controller is fully preserved in both air channels 30, 35 and in both exhaust gas channels 15, 20.

If one of the two specified exhaust gas back pressures pe_1_spec, pe_2 spec reaches the predefined maximum specified exhaust gas back pressure pe_max, which may be determined using a comparator not shown in the figures, an information signal may be formed by this comparator and relayed to first controller 25. First controller 25 may then prevent its integral component from being raised, provided first controller 25 has an integral component.

Instead of the above-described PID controllers, other controller structures, known to those skilled in the art, may also be used.

What is claimed is:

1. A method for regulating a boost pressure of an internal combustion engine having a multiflow air system which includes a multichannel air supply and a corresponding multichannel exhaust gas discharge, each of the exhaust gas channels having an exhaust gas turbocharger, the method comprising:

determining a manipulated variable for implementing a specified boost pressure to be set as a function of an actual exhaust gas back pressure prevailing in a particular one of the exhaust gas channels;

determining a total specified exhaust gas back pressure by a first controller from a difference between the specified boost pressure and an actual boost pressure;

determining a specified exhaust gas back pressure for the individual exhaust gas channels from the total specified exhaust gas back pressure as a function of a difference between air mass flows supplied via air channels of the engine; and determining a particular manipulated variable for the specified boost pressure to be set by an additional controller from a difference between the specified exhaust gas back pressure and the actual exhaust gas back pressure prevailing in the particular exhaust gas channel.

2. The method according to claim 1, further comprising setting a relationship between particular specified exhaust gas back pressures for individual exhaust gas channels in such a way that air mass flows supplied via the air channels are about equal.

3. The method according to claim 1, further comprising:

supplying the difference between the air mass flows supplied via the air channels to a further controller;

delivering by the further controller a weighting factor as a function of the difference between the air mass flows; and using the weighting factor to weight the total specified exhaust gas back pressure to form individual exhaust gas back pressures for particular exhaust gas channels.

4. The method according to claim 3, further comprising low-pass filtering the difference between the air mass flows supplied via the air channels.

5. The method according to claim 3, further comprising normalizing the difference between the air mass flows supplied via the air channels to an engine speed of the engine.

6. A device for regulating a boost pressure of an internal combustion engine having a multiflow air system which includes a multichannel air supply and a corresponding multichannel exhaust gas discharge, each of the exhaust gas channels having an exhaust gas turbocharger, the device comprising:

first computing means for determining, as a function of an actual exhaust gas back pressure prevailing in a particular one of the exhaust gas channels, a manipulated variable for a specified boost pressure to be set;

a first controller for determining a total specified exhaust gas back pressure from a difference between the specified boost pressure and an actual boost pressure;

second computing means for determining a specified exhaust gas back pressure for the individual exhaust gas channels from the total specified exhaust gas back pressure as a function of a difference between air mass flows supplied via air channels of the engine; and further controllers for determining a particular manipulated variable for the specified boost pressure to be set from a difference between the specified exhaust gas back pressure and the actual exhaust gas back pressure prevailing in the particular exhaust gas channel.

* * * * *